United States Patent
Albu et al.

(10) Patent No.: US 7,995,855 B2
(45) Date of Patent: Aug. 9, 2011

(54) IMAGE PROCESSING METHOD AND APPARATUS

(75) Inventors: Felix Albu, Bucharest (RO); Alexandru Drimbarean, Galway (IE); Adrian Zamfir, Bucharest (RO); Corneliu Florea, Bucharest (RO)

(73) Assignee: Tessera Technologies Ireland Limited, Galway (IE)

( * ) Notice: Subject to any disclaimer, the term of this patent is extended or adjusted under 35 U.S.C. 154(b) by 706 days.

(21) Appl. No.: 12/116,140

(22) Filed: May 6, 2008

(65) Prior Publication Data

US 2009/0185753 A1      Jul. 23, 2009

(30) Foreign Application Priority Data

Jan. 18, 2008    (EP) .................. PCT/EP2008/000378

(51) Int. Cl.
*G06K 9/40*    (2006.01)
(52) U.S. Cl. ........ 382/260; 382/274; 382/131; 382/195; 382/275; 348/674
(58) Field of Classification Search .......................... None
See application file for complete search history.

(56) References Cited

U.S. PATENT DOCUMENTS

| | | | |
|---|---|---|---|
| 6,335,990 B1 | 1/2002 | Chen et al. | |
| 6,823,086 B1 | 11/2004 | Dolazza | |
| 7,072,525 B1 | 7/2006 | Covell | |
| 7,352,394 B1 | 4/2008 | DeLuca et al. | |
| 7,356,174 B2 * | 4/2008 | Leue et al. | 382/131 |
| 7,409,083 B2 * | 8/2008 | Yano | 382/166 |
| 7,551,755 B1 | 6/2009 | Steinberg et al. | |
| 7,587,099 B2 * | 9/2009 | Szeliski et al. | 382/275 |
| 2002/0034337 A1 | 3/2002 | Shekter | |
| 2004/0042659 A1 | 3/2004 | Guo et al. | |
| 2004/0213478 A1 | 10/2004 | Chesnokov | |
| 2005/0013506 A1 * | 1/2005 | Yano | 382/274 |
| 2005/0041121 A1 | 2/2005 | Steinberg et al. | |
| 2005/0226484 A1 * | 10/2005 | Basu et al. | 382/131 |
| 2005/0249416 A1 * | 11/2005 | Leue et al. | 382/195 |
| 2005/0259185 A1 * | 11/2005 | Kim et al. | 348/674 |
| 2006/0039690 A1 | 2/2006 | Steinberg et al. | |

(Continued)

FOREIGN PATENT DOCUMENTS

WO    WO-2008131438 A2    10/2008

(Continued)

OTHER PUBLICATIONS

PCT Notification of Transmittal of the International Search Report and the Written Opinion of the International Searching Authority, or the Declaration, for PCT Application No. PCT/EP2008/000378, report dated Feb. 20, 2009, 10 Pages.

(Continued)

*Primary Examiner* — Anand Bhatnagar
*Assistant Examiner* — Tsung-Yin Tsai
(74) *Attorney, Agent, or Firm* — Andrew V. Smith

(57) ABSTRACT

A method of processing an image includes traversing pixels of an image in a single pass over the image. An inverting function is applied to the pixels. A recursive filter is applied to the inverted pixel values. The filter has parameters which are derived from previously traversed pixel values of the image. A pixel value is combined with a filter parameter for the pixel to provide a processed pixel value for a processed image.

57 Claims, 2 Drawing Sheets

U.S. PATENT DOCUMENTS

| | | |
|---|---|---|
| 2006/0098890 A1 | 5/2006 | Steinberg et al. |
| 2006/0120599 A1 | 6/2006 | Steinberg et al. |
| 2006/0204110 A1 | 9/2006 | Steinberg et al. |
| 2006/0285754 A1 | 12/2006 | Steinberg et al. |
| 2007/0177817 A1* | 8/2007 | Szeliski et al. ............... 382/275 |
| 2007/0189748 A1 | 8/2007 | Drimbarean et al. |
| 2007/0269108 A1 | 11/2007 | Steinberg et al. |
| 2007/0296833 A1 | 12/2007 | Corcoran et al. |
| 2008/0037840 A1 | 2/2008 | Steinberg et al. |
| 2008/0175481 A1 | 7/2008 | Petrescu et al. |
| 2008/0219581 A1 | 9/2008 | Albu et al. |
| 2008/0232711 A1 | 9/2008 | Prilutsky et al. |
| 2008/0292193 A1 | 11/2008 | Bigioi et al. |
| 2008/0309769 A1 | 12/2008 | Albu et al. |
| 2009/0080795 A1* | 3/2009 | Yano ............................. 382/274 |
| 2009/0297044 A1* | 12/2009 | Kokumai et al. ............. 382/219 |
| 2011/0044524 A1* | 2/2011 | Wang et al. .................. 382/131 |
| 2011/0044553 A1* | 2/2011 | Coupe et al. ................. 382/254 |

FOREIGN PATENT DOCUMENTS

| | | |
|---|---|---|
| WO | WO-2009036793 A1 | 3/2009 |
| WO | 2009/089847 A1 | 7/2009 |

OTHER PUBLICATIONS

PCT International Preliminary Report on Patentability Chapter I (IB/373), for PCT Application No. PCT/EP2008/000378, dated Jul. 20, 2010, 7 Pages.

Written Opinion of the International Search Authority, for PCT Application No. PCT/EP2008/000378, dated Jul. 18, 2010, 6 Pages.

EPO Communication pursuant to Article 94(3) EPC, for EPO application No. 08 701 156.5, report dated Jun. 26, 2010, 6 pages.

Final Office Action mailed Sep. 30, 2010, for U.S. Appl. No. 11/624,683, filed Jan. 18, 2007.

Co-pending U.S. Appl. No. 12/374,040, filed Jan. 15, 2009, inventors Milinea Gangea et al.

* cited by examiner

IMAGE PROCESSING METHOD AND APPARATUS

PRIORITY

This application claims priority to PCT patent application number PCT/EP2008/000378, filed Jan. 18, 2008, which is incorporated by reference.

FIELD OF THE INVENTION

The present invention relates to an image processing method and apparatus for improving the quality of an acquired image.

BACKGROUND

It is well known to apply filters to images to improve their characteristics.

U.S. Pat. No. 7,072,525, Covell discloses an adaptive filter for filtering a target version of a visual image that is produced by processing an original version of the visual image, the characteristics of the adaptive filter being determined in accordance with one or more characteristics of the original version of the visual image. The orientation and/or strength of filtering of the adaptive filter are adjusted based on local properties of the original image, which can enable the adaptive filter to avoid introducing blurring across true edges in the image.

U.S. Pat. No. 6,823,086, Dolazza discloses a system for adaptively filtering an image so as to reduce a noise component associated with the image. The system includes an image analyzer for determining image parameters related to the image. The system also includes a spatial filter, having an adjustable kernel responsive to the image parameters, for filtering the image sequence. The image analyzer manipulates the filter kernel as a function of the image parameters so that the system produces a filtered image, adaptable in real time, as a function of the unfiltered image, external rules, predetermined constraints, or combinations thereof. The spatial filter includes a time-invariant section and an adaptable section. The time-invariant section applies a plurality of filters to the image, each of the filters having a distinct frequency response, so as to produce a plurality of distinct filtered outputs. The adaptable section scales each of the plurality of distinct filtered outputs with a corresponding distinct weighting value to produce a plurality of scaled filtered outputs, and combines the plurality of scaled filtered outputs to produce a composite filtered output.

In Covell and Dolazza, several 2-D low pass filters, each with a distinct frequency response, are applied to the image and the outputs are weighted in order to produce a composite filtered output.

As such, the complexity of U.S. Pat. No. 7,072,525 and U.S. Pat. No. 6,823,086 is high. Also, these patents require an image analyzer or another image in order to decide on the behavior of the adaptive filters, i.e. at least one pass over the original image and the target image is necessary.

U.S. Pat. No. 6,335,990, Chen et al, discloses filtering in the spatial and temporal domain in a single step with filtering coefficients that can be varied depending upon the complexity of the video and the motion between the adjacent frames. The filter comprises: an IIR filter, a threshold unit, and a coefficient register. The IIR filter and threshold unit are coupled to receive video data. The IIR filter is also coupled to the coefficient register and the threshold unit. The IIR filter receives coefficients, a, from the coefficient register and uses them to filter the video data received. The IIR filter filters the data in the vertical, horizontal and temporal dimensions in a single step. The filtered data output by the IIR filter is sent to the threshold unit. The threshold unit compares the absolute value of the difference between the filtered data and the raw video data to a threshold value from the coefficient register, and then outputs either the raw video data or the filtered data.

Chen uses an IIR filter and a threshold unit and output the raw video data or filtered data. As such, the IIR filter operates on its previous outputs and the pixel values.

Referring to FIG. 1, US 2004/0213478, Chesnokov, discloses an image processing method comprising the step of processing an input signal to generate an adjusted output signal, wherein the intensity values I(x,y) for different positions (x,y) of an image are adjusted to generate an adjusted intensity value I'(x,y) in accordance with:

$$I_{out} = \sum_{i=0}^{N} \alpha_i(I) LPF\Omega_i[P_i(F(I))] \cdot Q_i(F(I)) + (1-\alpha_i)I,$$

where $P_i(\gamma)$ is an orthogonal basis of functions of $\gamma$ defined in the range $0<\gamma<1$; $Q_i(.)$ are anti-derivatives of $P_i(.)$: $Q_i(F(I)) = \int_0^{F(I)} P_i(\eta) d\eta$ or an approximation thereto; $LPF_\Omega[.]$ is an operator of low-pass spatial filtering; $\Omega_i$ is a cut-off frequency of the low-pass filter; $F(.)$ is a weighting function; and where $0<\alpha_i<1$.

The output of the weighting function $F(.)$ is monotonically decreasing with higher values of the pixels. There is a feedback from the output of the filtered sequence and the method can receive information other than from the image. For example, an amplification factor can be added to the linear or the logaritmic multiplication block and can be computed from a preview using an integral image. As such, in Chesnokov, significant processing steps are applied to the input signal, making the method quite complex and the output image is a weighted sum of the original and the processed image.

SUMMARY OF THE INVENTION

A technique is provided of processing an image. Multiple pixels are traversed in a single pass over the image. An inverting function is applied to the pixels. A recursive filter is applied to one or more inverted pixel values. The filter has one or more parameters derived from previously traversed pixel values of the image. The one or more pixel values are combined with the one or more parameters to provide processed pixel values for a processed image.

The image may include one or a combination of YCC or RGB format. For example, the image may include RGB format and the inverting function may invert a combination of one or more color plane values for a pixel. The image may include YCC format and the inverting function may invert an intensity value for a pixel.

The traversing may include one or a combination of: row wise; column wise; or traversing a path across the image.

The method may include providing an estimate of the average of the red, green and blue planes from previously traversed pixel values of the image, providing correction terms for one or more of the planes, where the correction terms are dependent on color channel average estimates, and where the combining includes multiplying a pixel value with a correction term. The correction terms may be limited by respective upper and lower thresholds.

The combining may include a linear or a logarithmic combination. The combining may include multiplying a pixel value, a correction term and a filter parameter for the pixel to provide a processed pixel value for a processed image.

The method may include providing an estimate of the average of red, green and blue channels as follows:

$$\overline{R}=\beta\cdot\overline{R}+(1-\beta)\cdot G(i,j,1)$$

$$\overline{G}=\beta\cdot\overline{G}+(1-\beta)\cdot G(i,j,2)$$

$$\overline{B}=\beta\cdot\overline{B}+(1-\beta)\cdot G(i,j,3),$$

where:
G(i,j,k) includes the pixel value for the respective red (R), green (G) or blue (B) color plane; and β is a coefficient between 0 and 1.

The correction terms $\gamma_R, \gamma_B$ for the red and blue color planes may include:

$$\gamma_R = \frac{\overline{G}}{\overline{R}} \cdot \frac{[(1-a)\cdot \overline{R} + 255\cdot a]}{[(1-a)\cdot \overline{G} + 255\cdot a]} \text{ and } \gamma_B = \frac{\overline{G}}{\overline{B}} \cdot \frac{[(1-a)\cdot \overline{B} + 255\cdot a]}{[(1-a)\cdot \overline{G} + 255\cdot a]}$$

where:
$\overline{R}, \overline{G}, \overline{B}$ comprise said color channel average estimates; and α is a positive value less than 1. The values of $\gamma_R$ and $\gamma_B$ may be limited to between 0.95 and 1.05

The recursive filter parameters H(i,j) may include:

$$H(i,j)=\alpha H(i,j-1)+(1-\alpha)(f(G(i,j,k)))$$

where:
α is the pole of the filter; G(i,j,k) is the pixel value for the respective red (R), green (G) or blue (B) color plane, or combinations thereof, and f(G(i, j, k)) is the inverting function. The value of α may be between 0.05 and 0.8.

The inverting function may include the following:

$$f(G(i, j, k), a, \delta) = \left(1 - a + \frac{255\cdot a}{\max(\delta, (G(i, j, 1) + G(i, j, 2) + G(i, j, 3))/3)}\right)$$

where:
α is a positive value less than 1; and δ is used in order to avoid division by zero and to amplify dark pixels.

The inverting function may include the following:

$$f(Y(i, j), a, \delta) = \left(1 - a + \frac{255\cdot a}{\max(\delta, Y(i, j))}\right)$$

where Y(i,j) is said pixel intensity value; α is a positive value less than 1; and
δ is used in order to avoid division by zero and to amplify dark pixels.

The combining may include:

$$G_1(i,j,1)=G(i,j,1)\cdot H(i,j)\cdot \gamma_R$$

$$G_1(i,j,2)=G(i,j,2)\cdot H(i,j)$$

$$G_1(i,j,3)=G(i,j,3)\cdot H(i,j)\cdot \gamma_B$$

where:
$\gamma_R, \gamma_B$ is the correction terms;
H(i,j) is the filter parameter; and
G(i,j,k) is the pixel value for the respective red (R), green (G) or blue (B) color plane, or combinations thereof.

The combining may include:

$$G_1(i, j, 1) = D - D\left(1 - \frac{G(i, j, 1)}{D}\right)^{\varepsilon H(i,j)\gamma_R},$$

$$G_1(i, j, 2) = D - D\left(1 - \frac{G(i, j, 2)}{D}\right)^{\varepsilon H(i,j)},$$

$$G_1(i, j, 3) = D - D\left(1 - \frac{G(i, j, 3)}{D}\right)^{\varepsilon H(i,j)\gamma_B}$$

where:
$\gamma_R, \gamma_B$ is the correction terms;
H(i,j) is the filter parameter;
G(i,j,k) is the pixel value for the respective red (R), green (G) or blue (B) color plane, or combinations thereof;
D is the maximum permitted pixel value; and
ε is a constant whose with a value between 1 and 3.

The image may be in YCC format and the recursive filter parameters H(i,j) may include:

$$H(i,j)=\alpha H(i,j-1)+(1-\alpha)(f(Y(i,j)))$$

where:
α is the pole of the IIR filter;
Y(i,j) is said pixel intensity value; and
f(Y(i, j)) is said inverting function.

The inverting function may include:

$$f(Y(i, j), \delta) = \frac{Y(i, j+1)}{\max(\delta, Y(i, j))}$$

where:
δ is used in order to avoid division by zero.

The combining may include:

$$Y_1(i,j)=Y(i,j)[1+\epsilon(i,j)\cdot(1-H(i,j))]$$

where:
H(i,j) is said filter parameter; and
ε(i, j) is a gain factor.

The parameter ε(i, j) may be constant or varies for the image, or a combination thereof.

The steps may be iteratively applied to one or more successively processed images that are respectively adapted to improve image luminance or image sharpness or both.

A one-pass image technique is also provided that uses an IR filter to improve the quality of pictures, using only one image and with efficient use of processor resources.

In one embodiment automatic correction is provided of uneven luminance in the foreground/background of an image. This implementation improves quality especially where the background is more illuminated/or darker than the foreground.

In another embodiment, an estimate of the average of the red, green and blue channels is provided while another recursive filter filters a term that has a component inversely proportional with the values of each color plane pixel value or the intensity value. Its output is multiplied with one or more correction terms dependent on the color channel(s) and preferably limited by two thresholds. The enhanced pixel value is obtained by using a linear or logarithmic model.

Using the embodiment, as well as an automatic correction of uneven luminance in the foreground/background, color boost is also obtained.

In the first embodiment, the average values of each color channel are not used for comparison purposes and they can be replaced by sliding averaging windows ending on the pixel being processed. In any case, these average values are used to determine correction terms which in turn are used to avoid over-amplification of red or blue channels.

Coefficients of the IIR filter may be fixed, rather than employ adaptive filters. As such, the present method involves one pass through an image, while the output of one filter does not have to be used as an input to another filter.

BRIEF DESCRIPTION OF THE DRAWINGS

An embodiment of the invention will now be described by way of example, with reference to the accompanying drawings, in which.

DETAILED DESCRIPTION OF THE EMBODIMENTS

Figure 1:
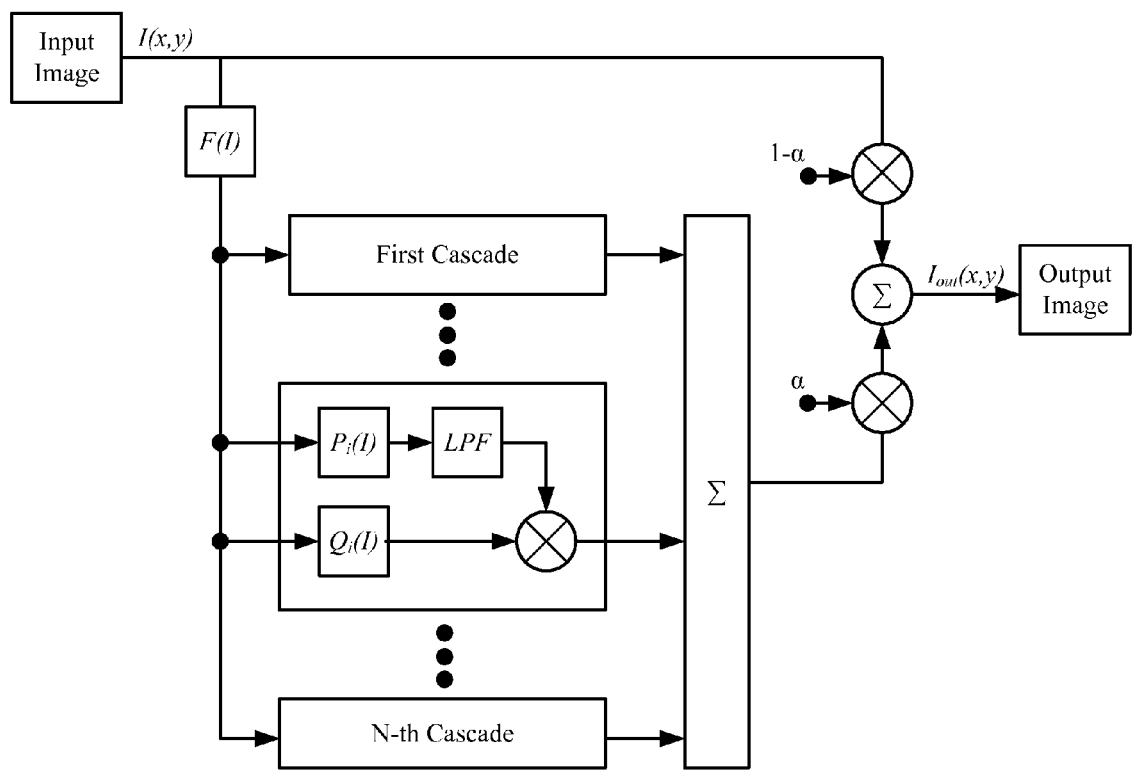
FIG. 1 is a block diagram of a conventional image enhancement system.
Figure 2:
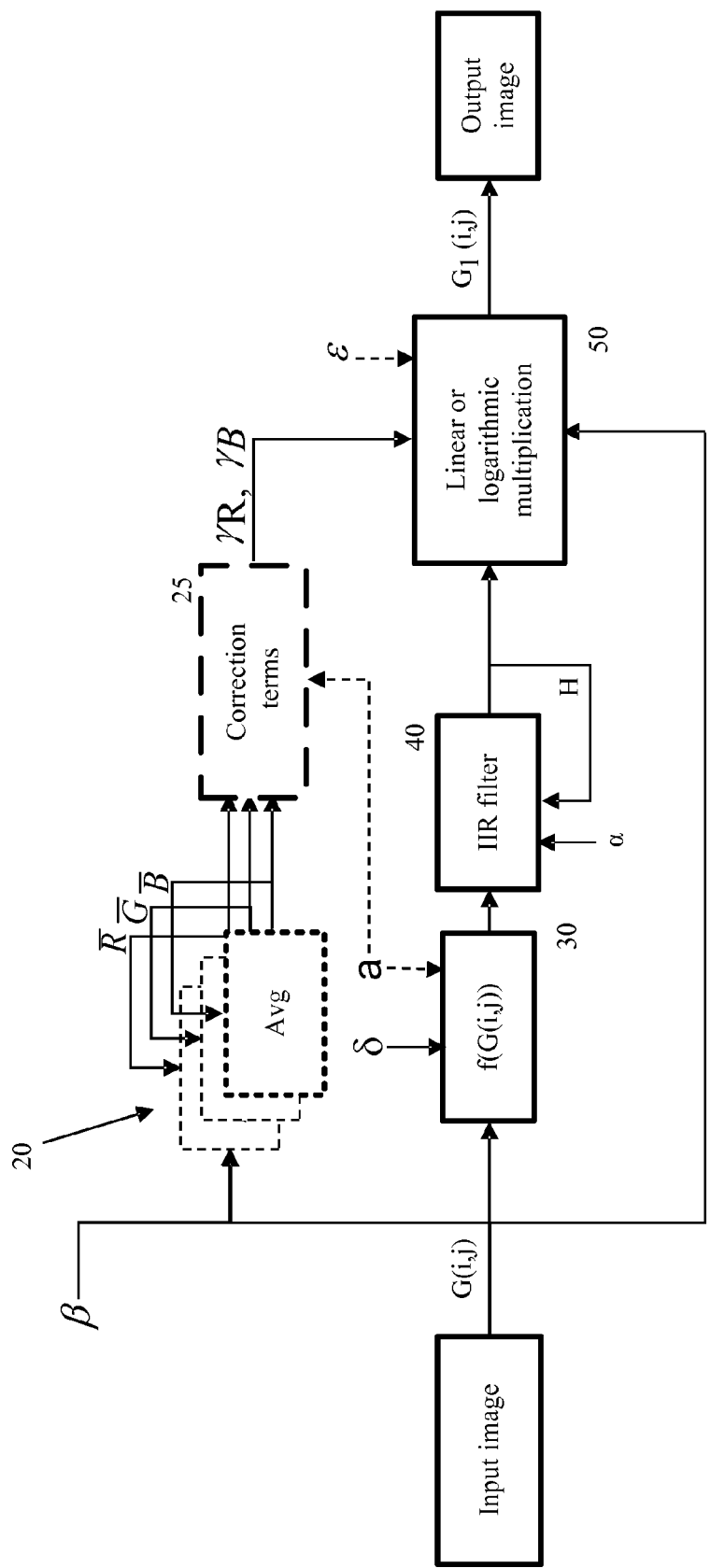
FIG. 2 is a block diagram of an image enhancement system according to an embodiment of the present invention.

Referring now to FIG. 2, an acquired image G is supplied for filtering according to the present invention. While the embodiment is described in terms of processing an image in RGB space, the invention can be applied to luminance channels only or other color spaces.

Only one input image, G, is used and a running average on each color channel is computed 20 as each pixel value is read. Therefore for each pixel $G(i,j,k)$ of each plane $k=1\ldots 3$, we compute:

$$\overline{R}=\beta\cdot\overline{R}+(1-\beta)\cdot G(i,j,1)$$

$$\overline{G}=\beta\cdot\overline{G}+(1-\beta)\cdot G(i,j,2)$$

$$\overline{B}=\beta\cdot\overline{B}+(1-\beta)\cdot G(i,j,3),$$

where $\beta$ is a coefficient between 0 and 1.

Another variant is to compute on each color channel, the sum of $2N+1$ pixel values around the pixel $G(i,j,k)$ and divide by $2N+1$.

From the moving average values, $\overline{R}, \overline{G}, \overline{B}$, correction terms $\gamma_R, \gamma_B$ are calculated, step 25, as follows:

$$\gamma_R = \frac{\overline{G}}{\overline{R}} \cdot \frac{[(1-a)\cdot \overline{R} + 255\cdot a]}{[(1-a)\cdot \overline{G} + 255\cdot a]} \text{ and } \gamma_B = \frac{\overline{G}}{\overline{B}} \cdot \frac{[(1-a)\cdot \overline{B} + 255\cdot a]}{[(1-a)\cdot \overline{G} + 255\cdot a]}$$

Preferably, both correction terms, $\gamma_R$ and $\gamma_B$ values are limited within a chosen interval (e.g. between 0.95 and 1.05; if any of $\gamma_R$ and $\gamma_B$ values is below 0.95 their value is set to 0.95; if any of $\gamma_R$ and $\gamma_B$ values is above 1.05 their value is set to 1.05). This prevents over-amplification of the red and blue channels in further processing.

In parallel with generating the moving average values, the pixels are parsed on rows or columns and for each pixel of a color plane $G(i,j,k)$, a coefficient $H(i,j)$ is calculated as follows:

$$H(i,j) = \alpha H(i,j-1) + (1-\alpha)\left(1-a + \frac{255\cdot a}{\max(\delta, (G(i,j,1)+G(i,j,2)+G(i,j,3))/3)}\right)$$

In FIG. 2, this processing is broken into step 30:

$$f(G(i,j,k),a,\delta) = \left(1-a + \frac{255\cdot a}{\max(\delta, (G(i,j,1)+G(i,j,2)+G(i,j,3))/3)}\right)$$

followed by a recursive filter, step 40:

$$H(i,j)=\alpha H(i,j-1)+(1-\alpha)(f(G(i,j,k),a,\delta))$$

where:

$\alpha$ is a positive value less than 1 (e.g. $\alpha=0.125$); and $\alpha$ is the pole of the corresponding recursive filtering, e.g. $\alpha$ can have values between 0.05 and 0.8).

The comparison with $\delta$ is used in order to avoid division by zero and to amplify dark pixels (e.g. $\delta=15$). The initial value $H(1,1)$ can have values between 1 and 2.

Using this filter, darker areas are amplified more than illuminated areas due to the inverse values averaging and, therefore, an automatic correction of uneven luminance in the foreground/background is obtained.

It will be seen from the above that the recursive filter, H, doesn't filter the pixel values. For example, if $\alpha=\alpha=\frac{1}{8}$ and $\delta=15$, the filter 30/40 is filtering a sequence of numbers that varies between 1 and 3 depending on actual pixel value $G(i,j,k)$ and the preceding values of the image. If the filter 40 simply uses as input the pixel values $G(i,j,k)$, it generates a simple low pass filtered image, with no luminance correction.

In one implementation of the embodiment, the modified pixel values, $G_1(i,j,k)$, are given by a linear combination, step 50, of the filter parameters H and the correction terms $\gamma_R, \gamma_B$:

$$G_1(i,j,1)=G(i,j,1)\cdot H(i,j)\cdot \gamma_R$$

$$G_1(i,j,2)=G(i,j,2)\cdot H(i,j)$$

$$G_1(i,j,3)=G(i,j,3)\cdot H(i,j)\cdot \gamma_B.$$

One more complex alternative to the linear model is a logarithmic model. In such an implementation, the output pixel $G_1(i,j,k)$ corresponding to the enhanced color plane (R/G/B color planes), is as follows:

$$G_1(i,j,1) = D - D\left(1 - \frac{G(i,j,1)}{D}\right)^{\varepsilon H(i,j)\gamma_R},$$

$$G_1(i,j,2) = D - D\left(1 - \frac{G(i,j,2)}{D}\right)^{\varepsilon H(i,j)},$$

$$G_1(i,j,3) = D - D\left(1 - \frac{G(i,j,3)}{D}\right)^{\varepsilon H(i,j)\gamma_B}$$

where:

D is the maximum permitted value (e.g. 255 for 8 bit representation of images); and $\varepsilon$ is a constant whose indicated values are between 1 and 3.

Examination of the formula above shows that only values smaller than D may be obtained. In this implementation, the degree of color and brightness boost are obtained by varying the pole value ($\alpha$) and the logarithmic model factor ($\varepsilon$).

The computations can be adapted for the YCC or other color spaces. For example, when using YCC color space in the embodiment of FIG. 2, there is no need to compute the correction terms $\gamma_R, \gamma_B$, and $\varepsilon=1$ for the Y channel if the logarithmic model is used. The inverting function for the Y channel is therefore:

$$f(Y(i, j), a, \delta) = \left(1 - a + \frac{255 \cdot a}{\max(\delta, Y(i, j))}\right).$$

The linear model can be applied for the luminance channel and the logarithmic model can be used for the chrominance channels using the H(i,j) coefficient computed on the luminance channel.

This approach leads to computational savings and add the possibility of adjusting the color saturation by using a different positive value for ε (e.g. ε=0.9) when computing the new chrominance values. The brightness of the enhanced image can be varied by multiplying the Y channel with a positive factor, ε, whose value can be different than the value of ε used for the chrominance channels.

In a second embodiment of the invention, the processing structure of FIG. 2 can be used to sharpen an image.

In this embodiment, the image is preferably provided in YCC format and the processing is performed on the Y channel only. The ratio of the next pixel and the current pixel value is computed and filtered with a one pole IIR filter (e.g. α=1/16), step 40. The operations can be performed on successive or individual rows or columns. The initial H coefficient is set to 1 and in case of operating on row i we have:

$$H(i, j) = \alpha H(i, j-1) + (1 - \alpha)\frac{Y(i, j+1)}{\max(\delta, Y(i, j))},$$

where:
α is the pole of the IIR filter.

Again, this processing can be broken down in step 30:

$$f(Y(i, j), \delta) = \frac{Y(i, j+1)}{\max(\delta, Y(i, j))}$$

followed by the recursive filter, step 40:

$$H(i,j)=\alpha H(i,j-1)+(1-\alpha)(f(Y(i,j),\delta))$$

Again, the comparison with δ is used in order to avoid division by zero (δ is usually set to 1). H(i, j) is a coefficient that corresponds to the current pixel position (i, j) of the original image. The initial coefficient can be set to 1 at the beginning of the first row or at the beginning of each row. In the first case, the coefficient computed at the end of the one row is used to compute the coefficient corresponding to the first pixel of the next row.

The enhanced pixel value $Y_1(i, j)$ is given by the following formula:

$$Y_1(i,j)=Y(i,j)[1+\epsilon(i,j)\cdot(1-H(i,j))]$$

where ε(i, j) can be a constant gain factor or a variable gain depending on the H coefficients. Another alternative for ε(i,j) is to use the difference between consecutive pixels or the ratio of successive pixel values. For example, if the difference between successive pixels is small (or the ratio of consecutive pixel values is close to 1) the value of ε(i, j) should be lower, because the pixel might be situated in a smooth area. If the difference is big (or the ratio is much higher or much lower than 1), the pixels might be situated on an edge, therefore the value of ε(i, j) should be close to zero, in order to avoid possible over-shooting or under-shooting problems. For intermediate values, the gain function should vary between 0 and a maximum chosen gain. An example of ε(i, j) according to these requirements has a Rayleigh distribution.

In some implementations, a look up table (LUT) can be used if a variable ε(i, j) is chosen, because the absolute difference between consecutive pixels has limited integer values.

This method is highly parallelizable and its complexity is very low. The complexity can be further reduced if LUTs are used and some multiplications are replaced by shifts.

Furthermore, this second embodiment can also be applied to images in RGB space.

The second embodiment can be applied in sharpening video frames either by sharpening each individual video frame or identified slightly blurred frames.

In each embodiment, the pixels can be parsed using any space-filling curves (e.g. Hilbert curves), not only by rows or columns. The corrected image can be thought as a continuously modified image, pixel by pixel, through a path of a continuously moving point.

It will also be seen that the image sharpening image processing of the second embodiment can be applied after the luminance correction of the first embodiment to provide a filtered image with even superior characteristics to either method implemented independently.

Indeed, either method can be applied in conjunction with other image processing methods as required for example following the processing described in PCT Application No. PCT/EP2007/009939 and U.S. application Ser. No. 11/856, 721, which are incorporated by reference.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited herein, as well as U.S. applications 60/945,558, Ser. Nos. 10/764,339, 12/042,335, 11/753,098, 11/752,925, 60/944,046, 11/767,412, 11/624, 683, and 11/856,721, and US published application 2005/ 0041121, 2006/0204110, 2006/0120599, 2006/0098890, 2006/0039690, 2006/0285754, 2007/0189748, 2008/ 0037840, and 2007/0269108, and U.S. Pat. No. 7,352,394, as well as the background, invention summary, abstract and brief description of the drawings, are each incorporated by reference into the detailed description of the preferred embodiments as disclosing alternative embodiments.

The invention claimed is:

1. A method of processing an image comprising:
   acquiring the image;
   using a processor;
   traversing multiple pixels of the image in a single pass over the image;
   applying an inverting function to said pixels;
   applying a recursive filter to one or more inverted pixel values, said filter having one or more parameters derived from previously traversed pixel values of said image; and combining said one or more pixel values with said one or more parameters to provide processed pixel values for a processed image wherein said inverting function comprises:

$$f(G(i,j,k),a,\delta) = \left(1 - a + \frac{255 \cdot a}{\max(\delta, (G(i,j,1)+G(i,j,2)+G(i,j,3))/3)}\right)$$

where:
- a is a positive value less than 1; and
- δ is used in order to avoid division by zero and to amplify dark pixels.

2. A method according to claim 1 wherein said image comprises one or a combination of YCC or RGB format.

3. A method according to claim 2 wherein said image comprises RGB format and wherein said inverting function inverts a combination of one or more color plane values for a pixel.

4. A method according to claim 3 further comprising:
- providing an estimate of the average of the red, green and blue planes from previously traversed pixel values of said image;
- providing correction terms for one or more of said planes, said correction terms being dependent on said color channel average estimates; and
- wherein said combining includes multiplying a pixel value with a correction term.

5. A method according to claim 4 wherein said correction terms are limited by respective upper and lower thresholds.

6. A method according to claim 4 wherein said providing an estimate of the average of said red, green and blue channels comprises:

$$\overline{R} = \beta \cdot \overline{R} + (1-\beta) \cdot G(i,j,1)$$

$$\overline{G} = \beta \cdot \overline{G} + (1-\beta) \cdot G(i,j,2)$$

$$\overline{B} = \beta \cdot \overline{B} + (1-\beta) \cdot G(i,j,3),$$

where:
- G(i,j,k) is the pixel value for the respective red (R), green (G) or blue (B) color plane; and
- β is a coefficient between 0 and 1.

7. A method according to claim 4 wherein said correction terms $\gamma_R, \gamma_B$ for each of said red and blue color planes comprise:

$$\gamma_R = \frac{\overline{G}}{\overline{R}} \cdot \frac{[(1-a) \cdot \overline{R} + 255 \cdot a]}{[(1-a) \cdot \overline{G} + 255 \cdot a]} \text{ and } \gamma_B = \frac{\overline{G}}{\overline{B}} \cdot \frac{[(1-a) \cdot \overline{B} + 255 \cdot a]}{[(1-a) \cdot \overline{G} + 255 \cdot a]}$$

where:
- $\overline{R}, \overline{G}, \overline{B}$ comprise said color channel average estimates; and
- a is a positive value less than 1.

8. A method as claimed in claim 7 wherein $\gamma_R$ and $\gamma_B$ are limited to between 0.95 and 1.05.

9. A method according to claim 4 wherein combining comprises:

$$G_1(i,j,1) = G(i,j,1) \cdot H(i,j) \cdot \gamma_R$$

$$G_1(i,j,2) = G(i,j,2) \cdot H(i,j)$$

$$G_1(i,j,3) = G(i,j,3) \cdot H(i,j) \cdot \gamma_B$$

where:
- $\gamma_R, \gamma_B$ are said correction terms;
- H(i,j) is said filter parameter; and
- G(i,j,k) is the pixel value for the respective red (R), green (G) or blue (B) color plane, oro combinations thereof.

10. A method according to claim 4 wherein combining comprises:

$$G_1(i,j,1) = D - D\left(1 - \frac{G(i,j,1)}{D}\right)^{\varepsilon H(i,j)\gamma_R},$$

$$G_1(i,j,2) = D - D\left(1 - \frac{G(i,j,2)}{D}\right)^{\varepsilon H(i,j)},$$

$$G_1(i,j,3) = D - D\left(1 - \frac{G(i,j,3)}{D}\right)^{\varepsilon H(i,j)\gamma_B}$$

where:
- $\gamma_R, \gamma_B$ are said correction terms;
- H(i,j) is said filter parameter;
- G(i,j,k) is the pixel value for the respective red (R), green (G) or blue (B) color plane, or combinations thereof;
- D is the maximum permitted pixel value; and
- ε is a constant whose with a value between 1 and 3.

11. A method according to claim 2 wherein said image comprises YCC format and wherein said inverting function inverts an intensity value for a pixel.

12. A method according to claim 11 wherein said inverting function comprises:

$$f(Y(i,j),a,\delta) = \left(1 - a + \frac{255 \cdot a}{\max(\delta, Y(i,j))}\right)$$

where
- Y(i,j) is said pixel intensity value;
- a is a positive value less than 1; and
- δ is used in order to avoid division by zero and to amplify dark pixels.

13. A method according to claim 1 wherein said traversing comprises one or a combination of row wise; column wise; or traversing an arbitrary path across the image.

14. A method according to claim 1 wherein said combining comprises applying a linear model.

15. A method according to claim 14 wherein said combining comprises multiplying said pixel value, a correction term and said filter parameter for said pixel to provide a pixel value for a processed image.

16. A method according to claim 1 wherein said recursive filter parameters H(i,j) comprise:

$$H(i,j) = \alpha H(i,j-1) + (1-\alpha)(f(G(i,j,k)))$$

where:
- α is the pole of the filter;
- G(i,j,k) is the pixel value for the respective red (R), green (G) or blue (B) color plane, or combinations thereof; and
- f(G(i,j,k)) is said inverting function.

17. A method according to claim 16 wherein α is between 0.05 and 0.8.

18. A method according to claim 16 wherein the combining includes applying a linear or logarithmic model, or both, to process said one or more pixel values to obtain said processed pixel values.

19. A method according to claim 1 wherein said image is in YCC format and said recursive filter parameters H(i,j) comprise:

$$H(i,j)=\alpha H(i,j-1)+(1-\alpha)(f(Y(i,j)))$$

where:
α is the pole of the IIR filter;
Y(i,j) is said pixel intensity value; and
f(Y(i,j)) is said inverting function.

20. A method according to claim 19 wherein said inverting function comprises:

$$f(Y(i,j),\delta) = \frac{Y(i,j+1)}{\max(\delta, Y(i,j))}$$

where:
δ is used in order to avoid division by zero.

21. A method according to claim 19 wherein said combining comprises:

$$Y_1(i,j)=Y(i,j)[1+\epsilon(i,j)\cdot(1-H(i,j))]$$

where:
H(i,j) is said filter parameter; and
ϵ(i,j) is a gain factor.

22. A method according to claim 21 wherein ϵ(i, j) is either constant or varies for said image.

23. The apparatus of claim 1, wherein said combining comprises applying the linear model for the luminance channel and the logarithmic model for the chrominance channels.

24. The apparatus of claim 23, wherein the applying the logarithmic model for the chrominance channels comprises using an H(i,j) coefficient computed on the luminance channel.

25. The method of claim 1, further comprising varying a degree of color or brightness boost, or both, by varying one or more parameters of the model.

26. The method of claim 1, further comprising adjusting color saturation by adjusting a parameter of the model when computing new chrominance values.

27. The method of claim 1, further comprising varying brightness of an enhanced image by adjusting a multiplier of a luminance channel by a parameter of the model.

28. The method of claim 27, wherein the parameter comprises a different parameter than that for adjusting one or more chrominance values.

29. A method according to claim 1, further comprising iteratively applying said traversing and combining to one or more successively processed images, each of said applying said inverting function and said applying said recursive filter and said traversing being respectively adapted to improve image luminance or image sharpness or both.

30. An image processing apparatus comprising:
one or more optics and a sensor for acquiring a digital image;
a processor; and
one or more storage media having digital code embodied therein for programming the processor to perform an image processing method comprising:
acquiring the image;
using the processor;
traversing multiple pixels of the image in a single pass over the image;
applying an inverting function to said pixels;
applying a recursive filter to one or more inverted pixel values, said filter having one or more parameters derived from previously traversed pixel values of said image; and combining said one or more pixel values with said one or more parameters to provide processed pixel values for a processed image wherein said inverting function comprises:

$$f(G(i,j,k),a,\delta) = \left(1-a+\frac{255\cdot a}{\max(\delta, (G(i,j,1)+G(i,j,2)+G(i,j,3))/3)}\right)$$

where:
a is a positive value less than 1; and
δ is used in order to avoid division by zero and to amplify dark pixels.

31. The apparatus of claim 30, wherein said image is in one of YCC or RGB format.

32. The apparatus of claim 31, wherein said images comprise RGB format and wherein said inverting function inverts a combination of one or more color plane values for a pixel.

33. The apparatus of claim 32, further comprising:
providing an estimate of an average of red, green and blue planes from previously traversed pixel values of said image;
providing correction terms for one or more of said planes, said correction terms being dependent on said average; and
wherein said combining includes multiplying a pixel value with a correction term.

34. The apparatus of claim 33, wherein said correction terms are limited by respective upper and lower thresholds.

35. The apparatus of claim 31, wherein said image comprises YCC format and wherein said inverting function inverts an intensity value for a pixel.

36. The apparatus of claim 30, wherein said combining comprises applying a linear model.

37. The apparatus of claim 36, wherein said combining comprises multiplying said pixel value, a correction term and said filter parameter for said pixel to provide a pixel value for a processed image.

38. The apparatus of claim 30, wherein said traversing comprises one or a combination of row wise; column wise; or traversing an arbitrary path across the image.

39. The apparatus of claim 30, wherein said combining comprises applying the linear model for the luminance channel and the logarithmic model for the chrominance channels.

40. The apparatus of claim 39, wherein the applying the logarithmic model for the chrominance channels comprises using an H(i,j) coefficient computed on the luminance channel.

41. The apparatus of claim 30, wherein the method further comprises varying a degree of color or brightness boost, or both, by varying one or more parameters of the model.

42. The apparatus of claim 30, wherein the method further comprises adjusting color saturation by adjusting a parameter of the model when computing new chrominance values.

43. The apparatus of claim 30, wherein the method further comprises varying brightness of an enhanced image by adjusting a multiplier of a luminance channel by a parameter of the model.

44. The apparatus of claim 43, wherein the parameter comprises a different parameter than that for adjusting one or more chrominance values.

45. One or more non-transitory computer-readable media having code embedded therein for programming a processor to perform a method of processing an acquired image, wherein the method comprises:

traversing multiple pixels of the image in a single pass over the image;
applying an inverting function to said pixels;
applying a recursive filter to one or more inverted pixel values, said filter having one or more parameters derived from previously traversed pixel values of said image; and
combining said one or more pixel values with said one or more parameters to provide processed pixel values for a processed image wherein said inverting function comprises:

$$f(G(i,j,k),a,\delta) = \left(1 - a + \frac{255 \cdot a}{\max(\delta, (G(i,j,1) + G(i,j,2) + G(i,j,3))/3)}\right)$$

where:
a is a positive value less than 1; and
δ is used in order to avoid division by zero and to amplify dark pixels.

46. One or more computer-readable media according to claim 45 wherein said image comprises one or a combination of YCC or RGB format.

47. One or more computer-readable media according to claim 45 wherein said traversing comprises one or a combination of row wise; column wise; or traversing an arbitrary path across the image.

48. One or more computer-readable media according to claim 45 wherein said combining comprises one of a linear or a logarithmic combination, or a combination thereof.

49. One or more computer-readable media according to claim 45 wherein said recursive filter parameters H(i,j) comprise:

$$H(i,j) = \alpha H(i,j-1) + (1-\alpha)(f(G(i,j,k)))$$

where:
α is the pole of the filter;
G(i,j,k) is the pixel value for the respective red (R), green (G) or blue (B) color plane, or combinations thereof; and
f(G(i,j,k)) is said inverting function.

50. One or more computer-readable media according to claim 45 wherein said image is in YCC format and said recursive filter parameters H(i,j) comprise:

$$H(i,j) = \alpha H(i,j-1) + (1-\alpha)(f(Y(i,j)))$$

where:
α is the pole of the IIR filter;
Y(i,j) is said pixel intensity value; and
f(Y(i,j)) is said inverting function.

51. One or more computer-readable media according to claim 45, comprising iteratively applying the method to one or more successively processed images and the steps being respectively adapted to improve image luminance or image sharpness or both.

52. One or more computer-readable media according to claim 45, wherein said combining comprises applying the linear model for the luminance channel and the logarithmic model for the chrominance channels.

53. One or more computer-readable media according to claim 45, wherein the applying the logarithmic model for the chrominance channels comprises using an H(i,j) coefficient computed on the luminance channel.

54. One or more computer-readable media according to claim 45, wherein the method further comprises varying a degree of color or brightness boost, or both, by varying one or more parameters of the model.

55. One or more computer-readable media according to claim 45, wherein the method further comprises adjusting color saturation by adjusting a parameter of the model when computing new chrominance values.

56. One or more computer-readable media according to claim 45, wherein the method further comprises varying brightness of an enhanced image by adjusting a multiplier of a luminance channel by a parameter of the model.

57. One or more computer-readable media according to claim 56, wherein the parameter comprises a different parameter than that for adjusting one or more chrominance values.

* * * * *